(12) United States Patent
Bloch et al.

(10) Patent No.: US 6,264,152 B1
(45) Date of Patent: *Jul. 24, 2001

(54) MULTIPLE ACCESS MOUNTING BRACKET

(75) Inventors: Brian M. Bloch, Perth Amboy; Richard S. Costa, Bedminster, both of NJ (US); Hung D. Mach, Flushing, NY (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,240

(22) Filed: Nov. 20, 1998

Related U.S. Application Data

(63) Continuation-in-part of application No. 09/118,746, filed on Jul. 17, 1998, now Pat. No. 6,045,103.

(51) Int. Cl.[7] ........................................................ E04G 3/00
(52) U.S. Cl. .................................... 248/274.1; 248/278.1; 343/882
(58) Field of Search .............................. 248/278.1, 274.1, 248/276.1, 282.1, 284.1; 343/882, 892, 878

(56) References Cited

U.S. PATENT DOCUMENTS

| 4,470,106 | * | 9/1984 | Norton | 362/398 |
|---|---|---|---|---|
| 4,489,910 | * | 12/1984 | Ferguson | 248/219.4 |
| 4,799,064 | * | 1/1989 | Nakamura | 343/766 |
| 4,931,809 | * | 6/1990 | Putman et al. | 343/882 |
| 5,033,711 | * | 7/1991 | Gregorich et al. | 248/664 |
| 5,201,896 | * | 4/1993 | Kruszewski | 248/278 |
| 5,526,010 | * | 6/1996 | Plunk | 343/882 |
| 5,760,749 | * | 6/1998 | Minowa et al. | 343/772 |
| 5,853,158 | * | 12/1998 | Riggle | 248/311.2 |
| 5,867,132 | * | 2/1999 | Blasing et al. | 343/890 |
| 5,926,151 | * | 7/1999 | Hagiwara et al. | 343/882 |
| 5,963,179 | * | 10/1999 | Chavez | 343/892 |
| 5,982,340 | * | 11/1999 | Trouche | 343/882 |
| 6,031,508 | * | 2/2000 | Ishizuka et al. | 373/882 |
| 6,045,103 | * | 4/2000 | Costa et al. | 248/278.1 |
| 6,081,240 | * | 6/2000 | Hemmingsen, II | 343/760 |

* cited by examiner

*Primary Examiner*—Anita M. King
*Assistant Examiner*—N. Morrison

(57) ABSTRACT

A mounting assembly allows a wireless interface device to be connected to a fixed object, such as house or building's exterior wall. The mounting assembly includes three interconnected brackets. The three brackets allow the wireless interface device to be selectively positioned horizontally and vertically relative to the exterior wall. By adjustment of the bracket, the wireless interface device can be accurately aimed toward a master transmitter/receiver. Once the wireless interface device is properly sighted or aimed, the wireless interface device can communicate with the master transmitter/receiver to establish internet access, telephone service, and/or television service to the house or building.

14 Claims, 3 Drawing Sheets

MULTIPLE ACCESS MOUNTING BRACKET

The present application is a continuation-in-part of application Ser. No. 09/118,746, filed on Jul. 17, 1998, now U.S. Pat. No. 6,045,103.

BACKGROUND OF THE INVENTION

1. Field of the Invention

The present invention relates to an adjustable mounting assembly for attaching one object to another object. More specifically, the present invention relates to a mounting assembly for attaching a wireless interface device to a fixed structure, and for allowing the wireless interface device to be oriented to a desired position relative to the fixed structure.

2. Description of the Background Art

Businesses and personal residences are developing into communication nerve centers, which transmit and receive multiple forms of information constantly and simultaneously. It is common place for both businesses and private homes to include facilities for receiving and/or transmitting telephone signal, television signals, and internet data. Usually, each type of media is provided by an independent service provider. Typically, each independent service provider has to install a fixed wiring system which interconnects the home or business to a central service facility.

With the emerging field of wireless communications, the present trend is toward wireless connections instead of hardwired connections. Wireless connections leave the environment surround the home or business free from unsightly wiring. Further, a wireless link can be utilized to transmit more data in less time than a hardwired connection.

In order to gain the benefits of a wireless connection, each business or house, or grouping thereof, must be provided with a servant wireless interface device for sending and receiving data from a master receiver/transmitter. The servant wireless interface device would be mounted to an exterior portion of the house or business, such as a wall, the roof, a window seal, or perhaps to a dedicated pole. The wireless interface device would then be directed toward the master receiver/transmitter. Accordingly, there exists a need in the art for a mounting assembly which can easily interconnect a wireless interface device to a portion of house, such as an exterior wall. Further, there exists a need in the art for a mounting assembly which allows the wireless interface device to be easily oriented toward a desired direction, and permits the wireless interface device to be locked into the desired position.

SUMMARY OF THE INVENTION

Accordingly, it is a primary object of the present invention to provide a mounting assembly which can be easily attached to a wireless interface device and to a portion of a fixed structure, such as an exterior wall of a house.

Another object of the present invention is to provide a mounting bracket which allows for accurate and secure sighting, or alignment, of the wireless interface device toward a master receiver/transmitter.

These and other objects of the present invention are fulfilled by providing an adjustable mounting assembly for attaching an interface device to a structure, said mounting assembly comprising: a first bracket for attachment to the interface device; a second bracket attached to said first bracket by at least one first pivotable connection to allow said second bracket to pivot about a first axis relative to said first bracket; and a third bracket attached to said second bracket by at least one second pivotable connection to allow said third bracket to pivot about a second axis relative to said second bracket, wherein said second axis is orthogonal to said first axis.

Moreover, these and other objects of the present invention are fulfilled by providing a combination of an interface device and a mounting assembly for attachment to a structure, said combination comprising: said interface device; and said mounting assembly, wherein said mounting assembly includes: a first bracket attached to said interface device; a second bracket attached to said first bracket by at least one first pivotable connection to allow said second bracket to pivot about a first axis relative to said first bracket; and a third bracket attached to said second bracket by at least one second pivotable connection to allow said third bracket to pivot about a second axis relative to said second bracket, wherein said second axis is orthogonal to said first axis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
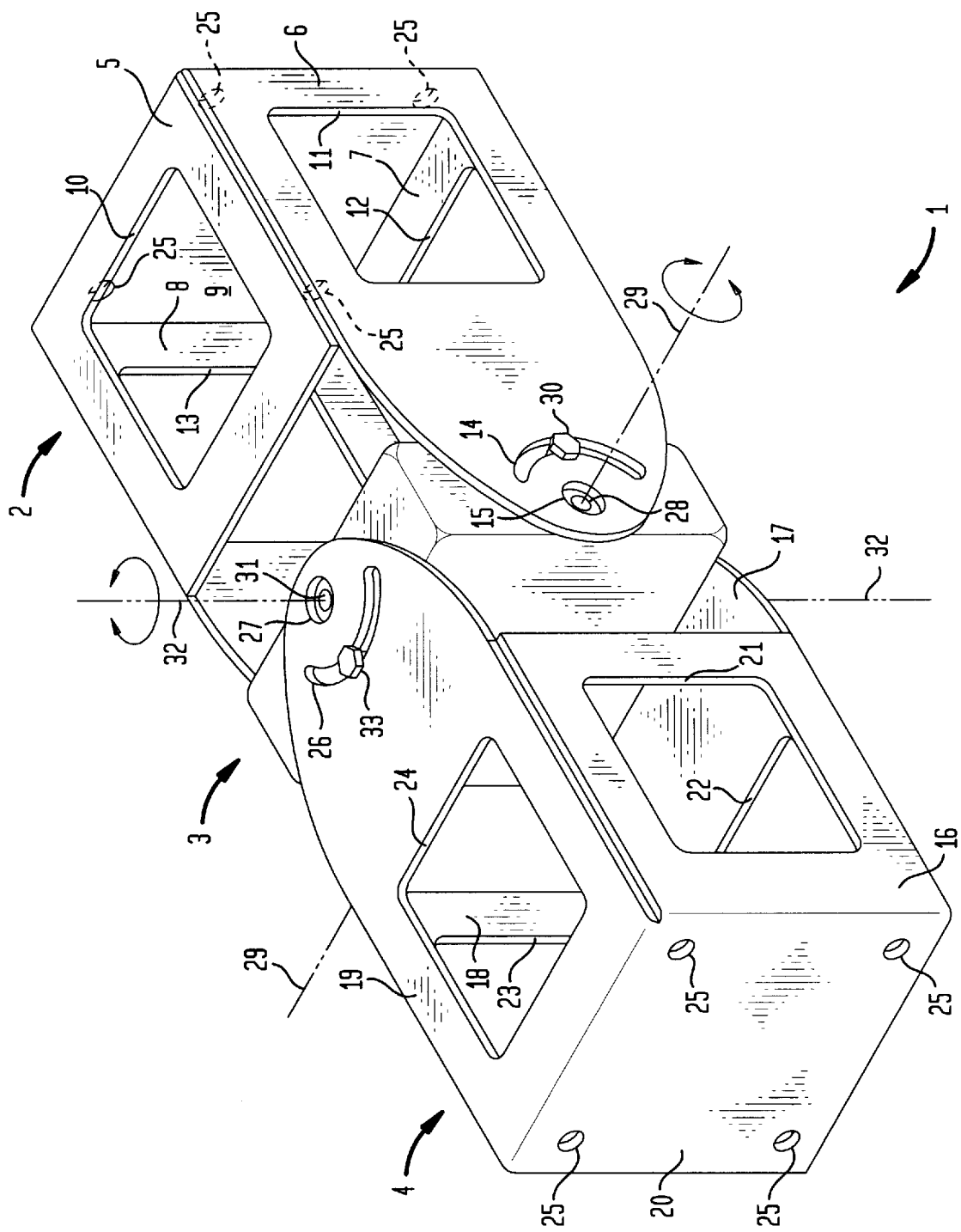
FIG. 1 is an upper-side perspective view of an adjustable mounting assembly, in accordance with the present invention.

Referring in detail to the drawings and with particular reference to FIG. 1, an adjustable mounting assembly 1, in accordance with the present invention, includes a first bracket 2, a second bracket 3 and a third bracket 4.

The first bracket 2 includes five sides, namely a first side 5, a second side 6, a third side 7, a fourth side 8, and a fifth side 9. The first side 5 has an overall rectangular or square shape. A first through hole 10 is formed in the first side 5.

The second side 6 has an overall shape defined by the combination of a square and a half-ellipse. A second through hole 11 is formed in the second side 6. The second side 6 shares a common edge with the first side 5.

The third side 7 has an overall rectangular or square shape. A third through hole 12 is formed in the third side 7. The third side 7 shares a common edge with the second side 6.

The fourth side 8 has an overall shape defined by the combination of a square and a half-ellipse. A fourth through hole 13 is formed in the fourth side 8. The fourth side 8 shares a common edge with the third side 7 and the first side 5.

The fifth side 9 has an overall rectangular or square shape. No large through hole is provided in the fifth side 9, rather four mounting holes 25 are provided. The mounting holes 25 are for receiving a threaded fastener, such as a screw or bolt, as will be later described.

The second side 6 includes a first through channel 14. The first through channel 14 is arc-shaped and is located in the half-ellipse portion of the second side's shape. The center of the arc shape of the first through channel 14 includes a first circular opening 15. The fourth side 8 is a mirror image of the second side 6. Therefore, the fourth side 8 also includes an arc-shaped, first through channel and a first circular opening formed at the center of the arc-shaped first through channel.

The third bracket 4 is a mirror image of the first bracket 2. The third bracket 4 includes five sides, namely a sixth side 16, a seventh side 17, an eighth side 18, a ninth side 19, and a tenth side 20. The sixth side 16 has an overall rectangular or square shape. A fifth through hole 21 is formed in the fifth side 16.

The seventh side 17 has an overall shape defined by the combination of a square and a half-ellipse. A sixth through hole 22 is formed in the seventh side 17. The seventh side 17 shares a common edge with the sixth side 16.

The eighth side 18 has an overall rectangular or square shape. A seventh through hole 23 is formed in the eighth side 18. The eighth side 18 shares a common edge with the seventh side 17.

The ninth side 19 has an overall shape defined by the combination of a square and a half-ellipse. An eighth through hole 24 is formed in the ninth side 19. The ninth side 19 shares a common edge with the eighth side 18 and the sixth side 16.

The tenth side 20 has an overall rectangular or square shape. No large through hole is provided in the tenth side 20, rather four mounting holes 25 are provided. The mounting holes 25 are for receiving a threaded fastener, such as a screw or bolt, as will be later described.

The ninth side 19 includes a second through channel 26. The second through channel 26 is arc-shaped and is located in the half-ellipse portion of the ninth side's shape. The center of the arc shape of the second through channel 26 includes a second circular opening 27. The seventh side 17 is a mirror image of the ninth side 19. Therefore, the seventh side 17 also includes an arc-shaped, second through channel and a second circular opening formed at the center of the arc-shaped second through channel.

The second bracket 3 has the general form of a closed box with six sides. A first pivotable connection 28 is made between the second bracket 3 and the first bracket 2. The first pivotable connection 28 is engaged within the first circular opening 15 of the second side 6. A similar pivotable connection would be made between the first circular opening of the fourth side 8 and the second bracket 3. The pivotable connections can be integral spurs formed on the second bracket 3, rivets attaching the first and second brackets 2, 3, or any other type of mechanical interconnections which allow the first bracket 2 to be pivoted freely relative to the second bracket 3 about a first axis 29.

The second bracket 3 includes a first threaded opening for receiving a first threaded faster 30. The first threaded fastener 30 is passed through the first through channel 14 prior to being engaged within the first threaded opening. The first threaded fastener 30 limits the extent of the angular adjustment between the first bracket 2 and the second bracket 3, when the first threaded fastener 30 abuts the distal ends of the first through channel 14. Also, by screwing the first threaded fastener 30 into the first threaded opening in the second bracket 3, the first bracket 2 can be locked into a specific angular relationship with the second bracket 3 relative to the first axis 29.

A second pivotable connection 31 is made between the second bracket 3 and the third bracket 4. The second pivotable connection 31 is engaged within the second circular opening 27 of the ninth side 19. A similar pivotable connection would be made between the second circular opening of the seventh side 17 and the second bracket 3. The pivotable connections can be integral spurs formed on the second bracket 3, rivets attaching the third and second brackets 4, 3, or any other type of mechanical interconnections which allow the third bracket 4 to be pivoted freely relative to the second bracket 3 about a second axis 32. The second axis 32 is orthogonal to the first axis 29.

The second bracket 3 includes a second threaded opening for receiving a second threaded faster 33. The second threaded fastener 33 is passed through the second through channel 26 prior to being engaged within the second threaded opening. The second threaded fastener 33 limits the extent of the angular adjustment between the third bracket 4 and the second bracket 3, when the second threaded fastener 33 abuts the distal ends of the second through channel 26. Also, by screwing the second threaded fastener 33 into the second threaded opening in the second bracket 3, the third bracket 4 can be locked into a specific angular relationship with the second bracket 3 relative to the second axis 32.

It is sufficient to provide through channels on just the second side 6 and the ninth side 19. By this arrangement, the positioning of the third bracket 4 relative to the first bracket 2 can be adjusted about the first axis 29 and the orthogonal, second axis 32. However, it is envisioned that though channels 14, 26 could be formed on the fourth side 8 and/or the seventh side 17. This alternative embodiment would afford an additional level of security when the position of the third bracket 4 is fixed relative to the first bracket 2. Further, although the first and second fasteners 30, 33 are illustrated as bolts, it should be appreciated that other types of fasteners could be employed, such as screws.

The first, second and third brackets 2, 3, 4 are preferably formed of an aluminum material. Each bracket can be stamped out from a sheet of aluminum. The stamped out portion would be folded and welded to arrive at the hollowed out first and third brackets 2, 4. The second bracket may be a hollow box formed from a sheet of aluminum, or may be a solid aluminum block.

Figure 2:
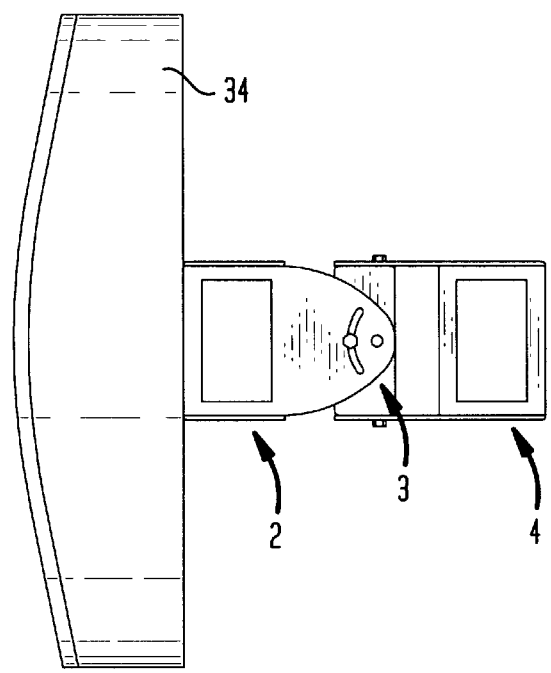
FIG. 2 is top view of the adjustable mounting, assembly of FIG. 1, attached to a wireless interface device.
Figure 3:
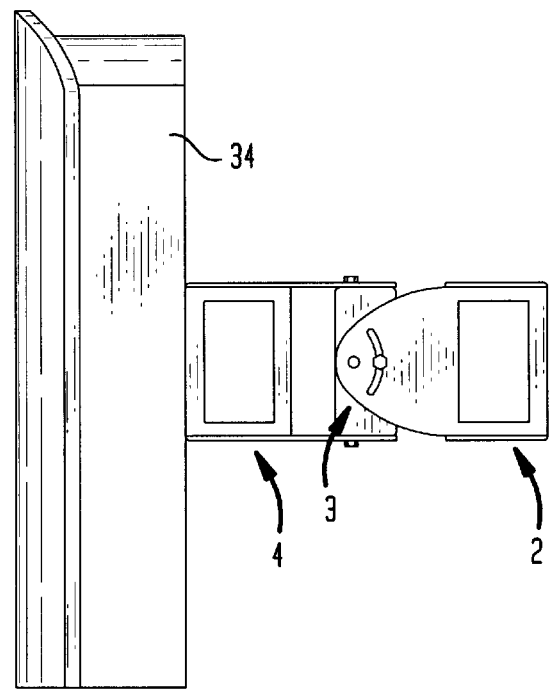
FIG. 3 is side view of the adjustable mounting assembly attached to the wireless interface device.
Figure 4:
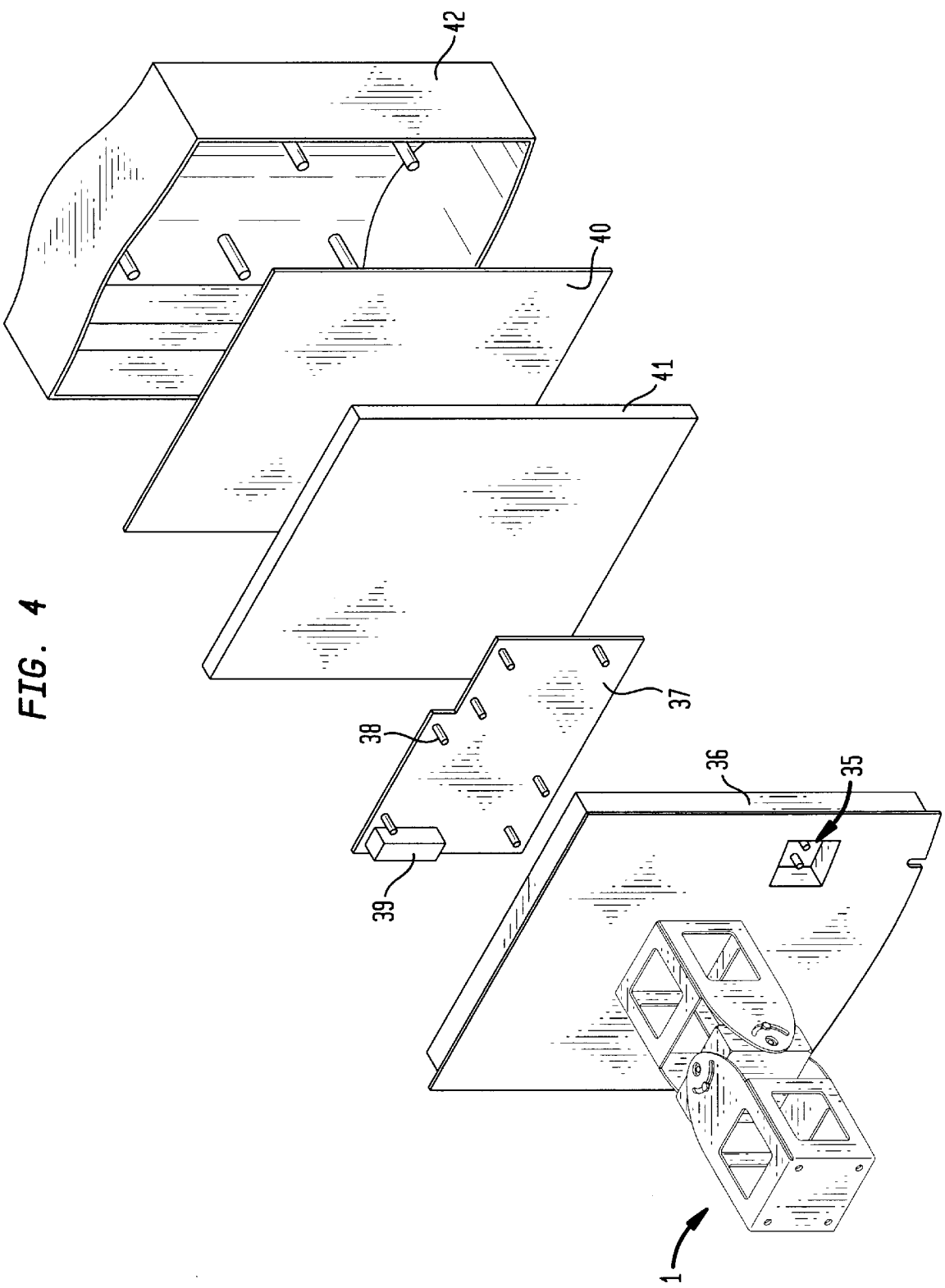
FIG. 4 is an exploded perspective view of the adjustable mounting assembly and the wireless interface device.

FIGS. 2–4 illustrate a combination of the mounting assembly 1 connected to a wireless interface device 34. FIGS. 2 and 3 are a top and side view of the combination, respectively. FIG. 4 is an exploded view illustrating the mounting assembly 1 and the components of the wireless interface device 34.

The wireless interface device 34 includes an input/output terminal box 35 formed in a back plate 36. The back plate 36 is physically connected to a printed circuit board 37 via a plurality of standoffs 38. The input/output terminals are electrically connected to the printed circuit board 37. Heat generated on the printed circuit board 37 is dissipated to the back plate 36 via a terminal block 39.

An antenna 40 is disposed on an opposite side of the printed circuit board 37. A reflector, or shielding plate 41 is disposed between the antenna 40 and the printed circuit board 37. A cover 42, constructed of a radio frequency (rf) transparent material, is provided to enclose the antenna 40. The cover 42, in conjunction with the back plate 36, protects the components of the wireless interface device 34 from dust, moisture, and other damaging environmental elements.

The mounting assembly 1 is attached to the wireless interface device 34 by using bolts and nuts in conjunction with the mounting holes 25 of the fifth side 9 of the first bracket 2. In a like manner, the mounting assembly 1 may be attached to a fixed structure, such a house's exterior wall, by employing bolts and nuts in conjunction with the mounting holes 25 in the tenth side 20 of the third bracket 4.

By the present invention, it is possible to easily attach the wireless interface device 34 to a fixed structure adjacent to a house or business. Further, by the present invention, one can easily aim and lock the position of the wireless interface device toward a master receiver/transmitter in order to establish a wireless link for the exchange of data. Such a wireless link is particularly beneficial in establishing an internet connection, general telephone service, and/or television programming.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adjustable mounting assembly for attaching an interface device to a structure, said mounting assembly comprising:

a first bracket for attachment to the interface device;

a second bracket attached to said first bracket by at least one first pivotable connection to allow said second bracket to pivot about a first axis relative to said first bracket; and a third bracket attached to said second bracket by at least one second pivotable connection to allow said third bracket to pivot about a second axis relative to said second bracket, wherein said second axis is orthogonal to said first axis and wherein said first bracket has an overall shape which is approximately identical to an overall shape of said third bracket, wherein one of said first bracket and said second bracket includes a first continuously-open arced though channel and the other of said first bracket and said second bracket includes a first threaded hole, and further comprising a first threaded fastener passing through said first arced though channel and being engaged in said first threaded hole, whereby said second bracket can be locked in a selectable positional relationship relative to said first bracket, and wherein one of said second bracket and said third bracket includes a second continuously-open arced through channel and the other of said second bracket and said third bracket includes a second threaded hole and further comprising a second threaded fastener passing through said second arced through channel and being engaged in said second threaded hole, whereby said third bracket can be locked in a selectable positional relationship relative to said second bracket.

2. The mounting assembly according to claim 1, wherein said first bracket includes a generally planar surface for attachment to the interface device.

3. The mounting assembly according to claim 1, wherein said at least one first pivotable connection includes two first pivotable connections and said at least one second pivotable connection includes two second pivotable connections.

4. The mounting assembly according to claim 1, wherein said second bracket has an overall shape which approximates a box.

5. The mounting assembly according to claim 1, wherein said first bracket, said second bracket and said third bracket are formed of aluminum.

6. The mounting assembly according to claim 1, wherein said first bracket, said second bracket and said third bracket are hollow brackets formed from folded aluminum sheet material.

7. The mounting assembly according to claim 1, wherein said first bracket includes said first arced through channel and said second bracket includes said first threaded hole.

8. The mounting assembly according to claim 1, wherein said first bracket includes said first arced through channel, said second bracket includes said first threaded hole and said second threaded hole, and said third bracket includes said second arced through channel.

9. A combination of an interface device and a mounting assembly for attachment to a structure, said combination comprising:

said interface device; and said mounting assembly, wherein said mounting assembly includes:

a first bracket attached to said interface device;

a second bracket attachment to said first bracket by at least one first pivotable connection to allow said second bracket to pivot about a first axis relative to said first bracket; and a third bracket attached to said second bracket by at least one second pivotable connection to allow said third bracket to pivot about a second axis relative to said second bracket, wherein said second axis is orthogonal to said first axis and wherein said first bracket has an overall shape which is approximately identical to an overall shape of said third bracket, wherein one of said first bracket and said second bracket includes a first continuously-open arced through channel and the other of said first bracket and said second bracket includes a first threaded hole, and further comprising a first threaded fastener passing through said first arced through channel and being engaged in said first threaded hole, whereby said second bracket can be locked in a selectable positional relationship relative to said first bracket, and wherein one of said second bracket and said third bracket includes a second continuously-open arced through channel and the other of said second bracket and said third bracket includes a second threaded hole and further comprising a second threaded fastener passing through said second arced through channel and being engaged in said second threaded hole whereby said third bracket can be locked in a selectable positional relationship relative to said second bracket.

10. The combination according to claim 3, wherein said interface device includes a wireless antenna for receiving data.

11. The combination according to claim 3, wherein said interface device includes a wireless antenna for receiving and transmitting data.

12. The combination according to claim 3, wherein said interface device includes a wireless antenna for establishing an internet connection.

13. The combination according to claim 3, wherein said second bracket has an overall shape which approximates a box.

14. The combination according to claim 3, wherein said first bracket, said second bracket and said third bracket are hollow brackets formed from folded aluminum sheet material.

* * * * *